(12) United States Patent
de Boer et al.

(10) Patent No.: US 9,938,401 B2
(45) Date of Patent: Apr. 10, 2018

(54) FIRE RETARDANT SYSTEMS FOR POLYMERS THAT ENABLE FLEXIBILITY AND STRENGTH

(71) Applicant: KRATON POLYMERS US LLC, Houston, TX (US)

(72) Inventors: Jan de Boer, Amsterdam (NL); Xavier Muyldermans, Mont St. Guibert (BE); Hiroshi Kato, Ibaraki (JP); Norio Masuko, Ibaraki (JP)

(73) Assignee: Kraton Polymers U.S. LLC, Houston, TX (US)

(*) Notice: Subject to any disclaimer, the term of this patent is extended or adjusted under 35 U.S.C. 154(b) by 289 days.

(21) Appl. No.: 14/069,533

(22) Filed: Nov. 1, 2013

(65) Prior Publication Data
US 2014/0128527 A1   May 8, 2014

Related U.S. Application Data

(60) Provisional application No. 61/722,389, filed on Nov. 5, 2012.

(51) Int. Cl.
*C08L 23/12* (2006.01)
*C08L 23/10* (2006.01)
*C08L 53/02* (2006.01)

(52) U.S. Cl.
CPC .............. *C08L 23/12* (2013.01); *C08L 23/10* (2013.01); *C08L 53/025* (2013.01); *C08L 2201/02* (2013.01)

(58) Field of Classification Search
CPC ........ C08L 53/00; C08L 53/02; C08L 53/025; C08L 23/10; C08L 23/12; C08L 23/16
See application file for complete search history.

(56) References Cited

U.S. PATENT DOCUMENTS

| | | |
|---|---|---|
| RE27,145 E | 6/1971 | Jones |
| 3,595,942 A | 7/1971 | Wald et al. |
| 3,634,549 A | 1/1972 | Shaw et al. |
| 3,670,054 A | 6/1972 | De La Mare et al. |
| 3,686,366 A | 8/1972 | Winkler |
| 3,700,633 A | 10/1972 | Wald et al. |
| 3,700,748 A | 10/1972 | Winkler |
| 3,985,830 A | 10/1976 | Fetters et al. |
| 4,039,593 A | 8/1977 | Kamienski et al. |
| 4,391,949 A | 7/1983 | St. Clair |
| 4,444,953 A | 4/1984 | St. Clair |
| 4,578,429 A | 3/1986 | Gergen et al. |
| 4,853,154 A | 8/1989 | Icenogle et al. |
| 5,180,889 A | 1/1993 | Rogers et al. |
| 5,194,535 A | 3/1993 | Koppes et al. |
| 6,492,469 B2 | 12/2002 | Willis et al. |
| 6,518,344 B1 | 2/2003 | Chundury et al. |
| 6,576,691 B2 | 6/2003 | Nakashima et al. |
| 6,660,190 B2 | 12/2003 | Huhn |
| 6,756,440 B2 | 6/2004 | Hase et al. |
| 7,053,145 B1 | 5/2006 | Taska et al. |
| 7,847,022 B2 | 12/2010 | Wright et al. |
| 8,110,629 B2 | 2/2012 | Kitano et al. |
| 2006/0084740 A1 | 4/2006 | Kao et al. |
| 2007/0078211 A1 | 4/2007 | Chang et al. |
| 2008/0167422 A1 | 7/2008 | Hashimoto |
| 2009/0030130 A1* | 1/2009 | Yasumoto ............. H01B 7/295  524/425 |
| 2012/0070665 A1 | 3/2012 | Bellomo et al. |

FOREIGN PATENT DOCUMENTS

| | | |
|---|---|---|
| CA | 716645 A | 8/1965 |
| CN | 1939963 A | 4/2007 |
| CN | 101283044 A | 10/2008 |
| CN | 101679870 A | 3/2010 |
| EP | 0370518 A2 | 5/1990 |
| EP | 1474458 B1 | 10/2007 |
| EP | 1932881 A1 | 6/2008 |
| JP | H02145633 A | 6/1990 |

(Continued)

OTHER PUBLICATIONS

International Search Report for PCT/US2013/067954 dated Feb. 28, 2014.
Foreign communication from a related counterpart application—First Office Action with translation, Chinese Application No. 201380057500.2, dated Jan. 26, 2016, 21 pages.

(Continued)

*Primary Examiner* — Peter D. Mulcahy
(74) *Attorney, Agent, or Firm* — Samantha Page; Cantor Colburn LLP

(57) ABSTRACT

The present invention relates to advanced flame/fire retardant compositions for fabric, upholstery, carpet, barrier, automotive, building construction, communication, and consumer electronics applications. The flame retardant composition comprises: about 5-25 wt. % hydrogenated styrenic block copolymer, about 6-40 wt. % polyolefin, about 50-80 wt. % inorganic flame retardant, about 0-5 wt. % coating, about 0-5 wt. % functionalized styrenic block copolymer, about 0-7 wt. % agri-derived heat resistant liquid, about 0.05-1.0 wt. % antioxidant, and about 0-7 wt. % optional additives such as metal deactivator, colorant, filler, and/or lubricants, wherein said composition totals 100 wt. %. An article made from the flame retardant composition, such as film, fiber, cable, and wire insulation meets various European and U.S. standards. The flame retardant compositions possess a good balance of tensile strength, elongation, flame resistance, and processability that has previously been unobtainable.

15 Claims, No Drawings

(56) References Cited

FOREIGN PATENT DOCUMENTS

| JP | 2002289040 A | 10/2002 |
| JP | 2006002117 A | 1/2006 |
| JP | 2006233126 A | 9/2006 |
| JP | 2006249311 A | 9/2006 |

OTHER PUBLICATIONS

XP-002758969, WZPI/Thompson.
Supplementary European Search Report for EP1385126, dated Jun. 20, 2016.

* cited by examiner

FIRE RETARDANT SYSTEMS FOR POLYMERS THAT ENABLE FLEXIBILITY AND STRENGTH

FIELD OF THE INVENTION

The present invention relates to advanced flame/fire retardant compositions for fabric, upholstery, carpet, barrier, automotive, building construction, communication and consumer electronics applications. The compositions generally contain polyolefin, selectively hydrogenated styrene-butadiene-styrene block copolymer, inorganic flame retardant comprising $Mg(OH)_2$, $Al(OH)_3$, hydromagnesite or huntite, or a mixture of two or more of these, and antioxidant. The selectively hydrogenated styrene-butadiene-styrene block copolymer (SEBS) may be functionalized, or be a controlled distribution selectively hydrogenated block copolymer (S-EB/S-S), or be a functionalized S-EB/S-S. At least one inorganic flame retardant may be selected from the group of natural (brucite) or synthetic $Mg(OH)_2$, or natural (gibbsite, bayesite, nordstrandite and doylite) or synthetic $Al(OH)_3$, hydromagnesite or huntite, or a mixture of two or more of these. At least 10 wt. % of the inorganic flame retardant is coated with silane, stearate, siloxane, or a non-polar non-functionalized polymeric coating, or a mixture of 2 or more of these. The inorganic flame retardant may also be a natural blend of huntite and hydromagnesite. Thus any of the inorganic flame retardant can be any component mentioned above, or any mixture of 2 or more of them. The polyolefin may be homo-polyethylene or homo-polypropylene, including LLDPE, LDPE, HDPE, etc., polyolefin copolymer, functional polyolefin, polyolefin elastomer, or a mixture of these. Lastly, the antioxidant, generally comprises a primary and secondary antioxidant. Of these 4 components, at least one of the polyolefin or selectively hydrogenated styrene-butadiene-styrene block copolymer contains at least 1 wt. % of a functionalized group. Optionally, metal deactivator, colorant such as pigment or color masterbatch, an agri-derived heat resistant liquid, and/or polytetrafluoroethylene (Teflon®) may be present in the composition. Compositions of the present invention possess a good balance of tensile strength, elongation, flame resistance, and processability that has previously been unobtainable. The ideal balance of these 4 components (polyolefin, selectively hydrogenated styrene-butadiene-styrene block copolymer, inorganic flame retardant, and antioxidant) is application and article specific.

BACKGROUND OF THE INVENTION

U.S. Pat. Publ. 2006/0084740 discloses a composition of 100 wt. parts SEBS, 150-250 wt. parts of Ammonium PolyPhosphate (APP), 30-50 wt. parts flame retardant auxiliary, 100-150 wt. parts oil, and 100-150 wt. parts polypropylene (PP).

U.S. Pat. Publ. 2008/167422 discloses and claims PP at 65-90 wt. %; SBC 10-35 wt. %; an inorganic flame retardant (FR) at 60-100 wt. % based on the sum of PP and SBC. The FR is hydroxide of Mg or Al.

U.S. Pat. No. 6,756,440 discloses and claims a fire resistant composition having PP, a functional SEBS, and a metal hydroxide flame retardant.

U.S. Pat. No. 4,853,154 discloses and claims a composition of: SEBS 15 to 20 wt. %, oil plasticizer at 4-8 wt. %, 4 to 8 wt. % PP, and 64 to 75 wt. % $Mg(OH)_2$ as flame retardant.

U.S. Pat. No. 6,576,691 discloses and claims a flame resistant polymer of PP, SEBS, a random copolymer of ethylene and an alpha olefin, and inorganic flame retardant.

The composition of the present invention passes one or both of the US standard UL-94 V0 or V1 tests, at a 1.6 mm thickness, indicating superior flame resistance. Similarly passing the European standard EN 60332-1-2, or US standard UL-62 (UL1581, VW-1) at minimal thickness indicates superior flame resistance. In many flame retardant applications, the smoke density is also of critical importance, as stated in European standard EN 50268-2 (now superseded by EN-IEC 61034). These prior art documents mentioned above are not capable of passing the smoke density requirements and the flame retardant tests at a 1.6 mm thickness. None of these documents discloses all four components. Accordingly there is a need in the market place for an improved composition that is cost competitive, and meets these various test standards.

Example market applications where the advantages of this innovation are expected to find utility include but are not limited to fabric, upholstery, carpet, barrier, automotive, building construction, communication, and consumer electronics applications that employ the unique and novel compositions of the present invention. Example articles that are expected to find utility in these market applications include but are not limited to coated fabrics, carpet backing, barrier sheets or films, automotive primary or harness wire insulation, building construction and communications wire insulation and jacketing, and consumer electronics wire insulation, jacketing, and plugs.

SUMMARY OF THE INVENTION

In the broadest sense the present invention is a flame retardant composition comprising: selectively hydrogenated styrenic block copolymer, polyolefin, inorganic flame retardant (wherein at least 10 wt. % of the retardant is coated with silane, stearate, siloxane, or a non-polar non-functionalized polymeric coating, or a mixture of 2 or more of these), antioxidant, and optionally agri-derived heat resistant liquid, metal deactivator, colorant, wherein said composition totals 100 wt. %. The selectively hydrogenated styrenic block copolymer may be a SEBS, a functionalized SEBS, a controlled distribution block copolymer (S-EB/S-S), or a functionalized controlled distribution block copolymer, or a mixture of these. The controlled distribution block copolymer increases the melt flow rate (MFR), thereby reducing viscosity to make processing the entire composition easier.

The selectively hydrogenated styrenic block copolymer may be formed sequentially or radially, or a mixture thereof. When SEBS is the main hydrogenated styrenic block copolymer, a minor portion of the SEBS may be functionalized SEBS. The functional group is grafted onto the SEBS or S-EB/S-S backbone. The functional group may be a monomer acid or its derivatives such as anhydrides, wherein suitable monomer acids or their derivatives include maleic acid, succinic acid, itaconic acid, fumaric acid, or acrylic acid. The polyolefin is polyolefin homo-polymer, polyolefin copolymer, functionalized polyolefin, polyolefin elastomer, or a mixture of 2 or more of these. If the SEBS is not functionalized, then it is preferred that a minor portion of the polyolefin is functionalized. Preferably there is some functionalized group present in the composition. The functional group is the same as set forth above and is grafted onto the polyolefin backbone. Preferably, at least 1 wt. % of the polyolefin or SEBS, or a mixture thereof, is functionalized and it is suitable if either or both are fully functionalized.

The inorganic flame retardant is selected from the group of: 1) natural aluminum hydroxide, such as gibbsite, bayesite, nordstrandite and doylite, or 2) synthetic aluminum hydroxide, or 3) natural magnesium hydroxide, known as brucite, or 4) synthetic magnesium hydroxide, or 5) huntite, or 6) hydromagnesite, or 7) a mixture of 2 or more of these. At least 10 wt. % of the total weight of the inorganic flame retardant, or all of the inorganic flame retardant is coated with silane, stearate, or siloxane compounds, or a non-polar non-functionalized polymeric coating, or a mixture of 2 or more of these.

Lastly, the antioxidant is generally a mixture of several types such as Irganox 1010, Irganox PS800, Irganox 1024 metal deactivator, and Irgafos PS 168.

DESCRIPTION OF THE PREFERRED EMBODIMENTS

Starting materials for preparing the block copolymers of the present invention include the initial monomers. The alkenyl arene can be selected from styrene, alpha-methylstyrene, para-methylstyrene, vinyl toluene, vinylnaphthalene, and para-butyl styrene or mixtures thereof. Of these, styrene is most preferred and is commercially available, and relatively inexpensive, from a variety of manufacturers.

The conjugated dienes for use herein are 1,3-butadiene and substituted butadienes such as isoprene, piperylene, 2,3-dimethyl-1,3-butadiene, and 1-phenyl-1,3-butadiene, or mixtures thereof. Of these, 1,3-butadiene is most preferred. As used herein, and in the claims, "butadiene" refers specifically to "1,3-butadiene".

These starting monomers for preparing a hydrogenated styrene-butadiene-styrene are reacted by sequential polymerization or coupling. In sequential polymerization an amount of styrene monomer is anionically reacted in a solvent with an initiator to form a block of polystyrene. This process is repeated for the butadiene, which attaches to the styrene block and forms a block copolymer of butadiene forming SB. Lastly more styrene monomer is added to the reactor, and the styrene attaches to the SB block and forms another styrene block copolymer—SBS. Thereafter, the SBS can be hydrogenated by exposing the SBS to hydrogen, as set forth below.

For coupling, SB is formed by the above process. Then the many polymerized SB units are coupled together (SB)nX to form SBS, using a coupling agent, where X is the residue of a coupling agent as explained hereinafter, and n is a number equal to 2 or more.

An important starting material for anionic co-polymerizations is one or more polymerization initiators, as mentioned previously. In the present invention such include, for example, alkyl lithium compounds and other organolithium compounds such as s-butyllithium, n-butyllithium, t-butyllithium, amyllithium and the like, including di-initiators such as the di-sec-butyl lithium adduct of m-diisopropenyl benzene. Other such di-initiators are disclosed in U.S. Pat. No. 6,492,469. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example, U.S. Pat. Nos. 4,039,593 and Re. 27,145, which descriptions are incorporated herein by reference.

The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogens make particularly suitable solvents. Frequently used are cyclic alkanes, such as cyclopentane, cyclohexane, cycloheptane, and cyclooctane, all of which are relatively non-polar. Other suitable solvents will be known to one skilled in the art and can be selected to perform effectively in a given set of process conditions, with temperature being one of the major factors taken into consideration.

Preparation of radial (branched) polymers requires a post-polymerization step called "coupling". It is possible to have either a branched selectively hydrogenated block copolymer and/or a branched tailored softening modifier. In the above radial formula for the selectively hydrogenated block copolymer, n is an integer of from 2 to about 30, preferably from about 2 to about 15, and X is the remnant or residue of a coupling agent. A variety of coupling agents are known in the art and include, for example, dihalo alkanes, silicon halides, siloxanes, multifunctional epoxides, silica compounds, esters of monohydric alcohols with carboxylic acids, (e.g. dimethyl adipate) and epoxidized oils. Star-shaped polymers are prepared with polyalkenyl coupling agents as disclosed in, for example, U.S. Pat. Nos. 3,985,830; 4,391,949; and 4,444,953; Canadian Pat. 716,645. Suitable polyalkenyl coupling agents include divinylbenzene, and preferably m-divinylbenzene. Preferred are tetra-alkoxysilanes such as tetra-ethoxysilane (TEOS) and tetramethoxysilane, alkyl-trialkoxysilanes such as methyl-trimethoxy silane (MTMS), aliphatic diesters such as dimethyl adipate and diethyl adipate, and diglycidyl aromatic epoxy compounds such as diglycidyl ethers deriving from the reaction of bis-phenol A and epichlorohydrin.

Coupling efficiency is of critical importance in the synthesis of block copolymers, which copolymers are prepared by a linking technology. In a typical anionic polymer synthesis, prior to the coupling reaction, the unlinked arm has only one hard segment (typically polystyrene). Two hard segments are required in the block copolymer if it is to contribute to the strength mechanism of the material. Uncoupled arms dilute the strength forming network of a block copolymer that weakens the material. The very high coupling efficiency realized in the present invention is key to making high strength, coupled, block copolymers.

Hydrogenation can be carried out via any of the several hydrogenation or selective hydrogenation processes known in the prior art. For example, such hydrogenation has been accomplished using methods such as those taught in, for example, U.S. Pat. Nos. 3,595,942; 3,634,549; 3,670,054; 3,700,633; and Re. 27,145, the disclosures of which are incorporated herein by reference. These methods operate to hydrogenate polymers containing aromatic or ethylenic unsaturation and are based upon operation of a suitable catalyst. Such catalyst, or catalyst precursor, preferably comprises a Group VIII metal such as nickel or cobalt which is combined with a suitable reducing agent such as an aluminum alkyl or hydride of a metal selected from Groups I-A, II-A and III-B of the Periodic Table of the Elements, particularly lithium, magnesium or aluminum. This preparation can be accomplished in a suitable solvent or diluent at a temperature from about 20° C. to about 80° C. Other catalysts that are useful include titanium based catalyst systems.

Hydrogenation can be carried out under such conditions that at least about 80 percent of the conjugated diene double bonds have been reduced, and between zero and 10 percent of the arene double bonds have been reduced. Preferred ranges are at least about 95 percent of the conjugated diene double bonds reduced, and more preferably about 98 percent of the conjugated diene double bonds are reduced. Alternatively, it is possible to hydrogenate the polymer such that aromatic unsaturation is also reduced beyond the 10 percent level mentioned above. Such exhaustive hydrogenation is usually achieved at higher temperatures. In that case, the double bonds of both the conjugated diene and arene may be reduced by 90 percent or more.

Once the hydrogenation is complete, it is preferable to extract the catalyst by stirring with the polymer solution a relatively large amount of aqueous acid (preferably 20-30 percent by weight), at a volume ratio of about 0.5 parts aqueous acid to 1 part polymer solution. Suitable acids include phosphoric acid, sulfuric acid and organic acids. This stirring is continued at about 50° C. for about 30 to about 60 minutes while sparging with a mixture of oxygen in nitrogen. Care must be exercised in this step to avoid forming an explosive mixture of oxygen and hydrocarbons.

It is well known in the art to modify the polymerization of the conjugated diene block to control the vinyl content. Broadly, this can be done by utilizing an organic polar compound such as an ether including cyclic ethers, polyethers and thioethers or an amine including secondary and tertiary amines. Both non-chelating and chelating polar compounds can be used.

Among the polar compounds which may be added in accordance with the one aspect of this invention are dimethyl ether, diethyl ether, ethyl methyl ether, ethyl propyl ether, dioxane, dibenzyl ether, diphenyl ether, dimethyl sulfide, diethyl sulfide, tetramethylene oxide (tetrahydrofuran), tripropyl amine, tributyl amine, trimethyl amine, triethyl amine, pyridine and quinoline and mixtures thereof.

In the present invention "chelating ether" means an ether having more than one oxygen as exemplified by the formula $R(OR')_m(OR")_o$ OR where each R is individually selected from 1 to 8, preferably 2 to 3, carbon atom alkyl radicals; R' and R" are individually selected from 1 to 6, preferably 2 to 3, carbon atom alkylene radicals; and m and o are independently selected integers of 1-3, preferably 1-2. Examples of preferred ethers include diethoxypropane, 1,2-dioxyethane (dioxo) and 1,2-dimethyoxyethane (glyme). Other suitable materials include —$CH_3$, —$OCH_2$, —$CH_2$, and —$OCH_3$ (diglyme). "Chelating amine" means an amine having more than one nitrogen such as N,N,N',N'-tetramethylethylene diamine.

The amount of polar modifier is controlled in order to obtain the desired vinyl content in the conjugated diene block. The polar modifier is used in an amount of at least 0.1 moles per mole of lithium compound, preferably 1-50, more preferably 2-25 moles of promoter per mole of the lithium compound. Alternatively, the concentration can be expressed in parts per million by weight based on the total weight of solvent and monomer. Based on this criteria from 10 parts per million to about 1 weight percent, preferably 100 parts per million to 2000 parts per million are used. This can vary widely, however, since extremely small amounts of some of the preferred modifiers are very effective. At the other extreme, particularly with less effective modifiers, the modifier itself can be the solvent. Again, these techniques are well known in the art, disclosed for instance in Winkler, U.S. Pat. No. 3,686,366 (Aug. 22, 1972), Winkler, U.S. Pat. No. 3,700,748 (Oct. 24, 1972) and Koppes et al., U.S. Pat. No. 5,194,535 (Mar. 16, 1993), the disclosures of which are hereby incorporated by reference. Suitable hydrogenated SBS block copolymer, also known as styrene-ethylene/butylene-styrene (SEBS), are available from Kraton type G block copolymers such as G-1643, G-1645, G-1651, G 1652, G-1654, etc. In the compositions of the present invention, the SEBS is present in a range from about 5 to about 25 wt. %, including all ranges there between.

To produce a functionalized SEBS, U.S. Pat. No. 4,578,429 to Gergen discloses how a styrenic block copolymer is grafted with a monomer acid or its derivatives such as anhydrides, wherein suitable monomer acids or their derivatives include maleic acid, succinic acid, itaconic acid, fumaric acid, and acrylic acid. This reference is hereby incorporated by reference. Suitable maleic anhydride functionalized SEBS are available from Kraton as types FG-1901, FG-1924. Other functionalized SEBS are also known and acceptable, such as a functionalized controlled distribution block copolymer. In the compositions of the present invention, functionalized SEBS is present in a range from 0 to 5 wt. %, including all ranges there between.

Polymer A

Polymer A is a controlled distribution polymer (S-EB/S-S) that has low viscosity and therefore high MFR (melt flow rate). It is employed in a few of the compositions set forth in the attached examples. The S-EB/S-S used in the new composition contains mono alkenyl arene end blocks A and a unique hydrogenated mid-block B of a mono alkenyl arene and a conjugated diene in which the mono alkenyl arene and conjugated diene are arranged in a controlled distribution. Block copolymers having a controlled distribution block B are known and have been described in EP Pat. 1474458 A. For purposes hereof, "controlled distribution" is defined as referring to a molecular structure having the following attributes: (1) terminal regions adjacent to the mono alkenyl arene homopolymer ("A") blocks that are rich in (i.e., have a greater than average amount of) conjugated diene units; (2) one or more regions not adjacent to the A blocks that are rich in (i.e., have a greater than average amount of) mono alkenyl arene units; and (3) an overall structure having relatively low blockiness. For the purposes hereof, "rich in" is defined as greater than the average amount, preferably greater than 5% the average amount.

The styrene blockiness index is simply the percentage of blocky styrene (or other alkenyl arene) to total styrene units: Blocky %=100 times (Blocky Styrene Units/Total Styrene Units). For the hSBC used in the thermofusible composition of the present invention, it is preferred that the styrene blockiness index of block B be less than about 10.

Preferably, the controlled distribution copolymer block has three distinct regions—conjugated diene rich regions on the end of the block and a mono alkenyl arene rich region near the middle or center of the block. Typically the region adjacent to the A block comprises the first 15 to 25% of the block and comprises the diene rich region(s), with the remainder considered to be arene rich. The term "diene rich" means that the region has a measurably higher ratio of diene to arene than the arene rich region. What is desired is a mono alkenyl arene/conjugated diene controlled distribution copolymer block, wherein the proportion of mono alkenyl arene units increases gradually to a maximum near the middle or center of the block (when describing an ABA structure) and then decreases gradually until the polymer block is fully polymerized. This structure is distinct and different from the tapered and/or random structures discussed in the prior art.

The selectively hydrogenated mono alkyl arene-conjugated diene block copolymers (hSBC) may have a linear configuration such as A-B-A. The block copolymers can also be structured to form a branched (branched) polymer, (A-B) nX or (A-B-A)nX, or both branched and linear types of structures can be combined in a mixture. Some A-B diblock polymer can be present up to about 30 weight percent of the hSBC, but preferably at least about 70 weight percent of the block copolymer is A-B-A or branched (or otherwise branched so as to have 2 or more terminal resinous blocks per molecule) so as to impart strength. Other structures include (A-B)n and (A-B)nA. In the above formulas, n is an integer from about 2 to about 30, preferably from about 2 to about 15, more preferably from about 2 to 6 and X is the remnant or residue of the coupling agent.

It is also important to control the molecular weight of the various blocks. Desired number average block weights are from about 5.0 to about 7.5 kg/mol for the mono alkenyl arene A block. For the triblock, which may be a sequential ABA or coupled (AB)2 X block copolymer, the total apparent number average molecular weight should be from about 70 to about 150 kg/mol, preferably from about 125 to about 150 kg/mol, and for the coupled copolymer from about 35 to about 75 kg/mol per arm, preferably from about 62.5 to about 75 kg/mol per arm. With the expression "apparent", as used throughout the specification, is meant the molecular weight of a polymer as measured with gel permeation chromatography (GPC) also referred to as Size Exclusion Chromatography (SEC) using polystyrene calibration standards (using a method analogue to the method described in ASTM D5296-05). Reference is made herein to number average molecular weight. The molecular weight distribution (Mw/Mn) for anionically polymerized polymers is small. Therefore, as is common in the art, as number average molecular weight the peak position is used, since the differences between the peak molecular weight (Mp) and the number average molecular weight (Mn) are very small. Another important aspect of the present invention is to control the microstructure or vinyl content of the conjugated diene in the controlled distribution copolymer block. The term "vinyl content" refers to the fact that a conjugated diene is polymerized via 1,2-addition (in the case of butadiene—it would be 3,4-addition in the case of isoprene). Thus, "vinyl" in no way refers to PVC. When referring to the use of butadiene as the conjugated diene, it is preferred that at least about 40 weight percent, preferably at least 60 weight percent, more preferably from about 60 to about 80 weight percent and most preferably from about 65 to about 75 weight percent of the condensed butadiene units in the copolymer block have 1,2 vinyl configuration as determined by proton NMR analysis.

For the controlled distribution B block the weight percent of mono alkenyl arene in each B block is from about 10 weight percent to about 40 weight percent, preferably from about 15 to 30 weight percent, most preferably from about 20 weight percent to about 25 weight percent.

The block copolymer is selectively hydrogenated. Hydrogenation can be carried out via any of the several hydrogenation or selective hydrogenation processes known in the prior art. For example, such hydrogenation has been accomplished using methods such as those taught in, for example, U.S. Pat. No. 3,670,054 and U.S. Pat. No. 3,700,633. Hydrogenation can be carried out under such conditions that at least about 90 percent of the conjugated diene double bonds have been reduced, and between zero and 10 percent of the arene double bonds have been reduced. Preferred ranges are at least about 95 percent of the conjugated diene double bonds reduced, and more preferably about 98 percent of the conjugated diene double bonds are reduced. Alternatively, it is possible to hydrogenate the polymer such that aromatic unsaturation is also reduced beyond the 10 percent level mentioned above. In that case, the double bonds of both the conjugated diene and arene may be reduced by 90 percent or more.

In other words, the controlled distribution S-EB/S-S (i) is preferably a selectively hydrogenated block copolymer having the general configuration A-B-A, (A-B)n, (A-B-A)n, (A-B-A)nX, (A-B)nX, or mixtures thereof, where n is an integer from 2 to about 30, preferably 2 to about 15, more preferably 2 to 6 and X is coupling agent residue and wherein:
 a) prior to hydrogenation each A block is a mono alkenyl arene polymer block and each B block is a controlled distribution copolymer block of at least one conjugated diene and at least one mono alkenyl arene;
 b) subsequent to hydrogenation about 0-10%, preferably less than 5% of the arene double bonds have been reduced, and at least about 80% preferably about 90 or more percent, still more preferably about 98 or more percent of the conjugated diene double bonds have been reduced;
 c) the total apparent number average molecular weight (determined by GPC) is in the range of from about 70 to about 150 kg/mol, preferably from about 125 to about 150 kg/mol, for a linear S-EB/S-S and from about 35 to about 75 kg/mol, preferably from about 62.5 to about 75 kg/mol for each arm of a branched S-EB/S-S, wherein each A block has a number average molecular weight from about 5.0 to about 7.5 kg/mol;
 d) each B block comprises terminal regions adjacent to the A blocks that are rich in conjugated diene units and one or more regions not adjacent to the A blocks that are rich in mono alkenyl arene units;
 e) the total amount of mono alkenyl arene in the hydrogenated block copolymer is from about 20 to about 45 weight percent, preferably from about 30 to about 40 weight percent; and
 f) the weight percent of mono alkenyl arene in each B block is from about 10 to about 40 weight percent, preferably from about 15 to about 30 weight percent, most preferably from about 20 to about 25 weight percent;
 g) each B block has a styrene blockiness index of less than 10 percent; and
 h) the weight percent of vinyl in each B block is at least about 40 weight percent.

The amount of Polymer A employed in the present invention depends on processability of the flame retardant composition. Because Polymer A has high MFR and therefore low viscosity, those skilled in the art would replace some or all the SEBS and/or functionalized SEBS with Polymer A to achieve acceptable processability.

Olefin Block Polymer Components

The polyolefin of the present invention can be a homopolymer such as polypropylene or polyethylene, such as HDPE, LDPE, LLDPE, etc., or a mixture thereof. It may also be a polyolefin copolymer of ethylene or propylene or any $C_4$-$C_9$ olefin hydrocarbon, such as butene-octene copolymer, polytetrafluoroethylene, or any mixture of 2 or more thereof (HDPE, LDPE and LLDPE are actually copolymers, but are often treated as homopolymers because the small amount of the non-ethylene comonomer). The olefin copolymers are often elastomeric in nature. The polyolefin may also be a functionalized polyolefin (up to 5 wt % of the polyolefin) where a monomer acid or a derivative thereof, such as maleic anhydride, is grafted onto the polymer backbone. Maleic anhydride grafted onto polypropylene is known in the market place under the tradename Priex® 25093 or 25097 which vary in the amount of grafted maleic anhydride. A mixture of 2 or more of the polyolefins mentioned above is also inclusive within the present invention. In the compositions of the present invention, the polyolefin is present in a range from about 6 to about 40 wt. %, including all ranges there between.

Different types of flame retardant technologies and approaches exist. The type and composition of the FR is chosen based on its efficiency in the polymer matrix of interest. In the case of polyolefinic or styrenic block copolymers, intumescent and endothermic flame retardants can be used in addition to a variety of additives that provide specific features.

Intumescent flame retardants are mixtures of different components that work together under fire conditions to form a protective or insulation barrier layer (e.g. carbon foam), which separates the combustible material from the fire or heat source. Preferably, intumescent FRs of the P-N type is used with P content>25% either composed of single composition or mixed composition. Endothermic flame retardants function in gas phase and condensed phase by releasing non-flammable gases which dilutes the fuel and cools the polymer. Preferably, endothermic flame retardants of the inorganic type are used here. Other commonly used additives are anti-drip additives (organoclay/nanoclay, zinc borate, polytetrafluoroethylene), char promotors, smoke suppressants (calcium borosilicate, zinc borate, zinc hydroxystannate, zinc stannate), glass-building additives.

The inorganic flame retardant is selected from the group of synthetic or natural aluminum hydroxide, hydromagnesite and/or huntite, or synthetic or natural magnesium hydroxide, or a mixture of these. Although no coating is within the scope of the present invention, preferably some or all of the inorganic flame retardant is coated with silane, stearate, non-polar non-functionalized polymeric coating, or siloxane compounds, or a mixture of 2 or more of these coatings. When present in the flame retardant compositions, the coating comprises up to about 10 wt. %, and preferably about 0.2 to about 5 wt. % of the inorganic flame retardant. Additionally, the natural forms of $Al(OH)_3$ are known as gibbsite, bayesite, nordstrandite and doylite. These natural forms may also be coated as described above for the synthetic product. The natural form of $Mg(OH)_2$ is known as brucite, and like the synthetic magnesium hydroxide, brucite may also be coated with silane, stearate, non-polar non-functionalized polymeric coating, or siloxane compounds, or a mixture of 2 or more of these coatings. Further the inorganic flame retardant of the present invention can be a mixture of 2 or more of any of the above list. In the compositions of the present invention, the inorganic flame retardant is present in a range from about 50 to about 80 wt. %, including all ranges there between. Further the coating may be applied to the inorganic flame retardant by the supplier of the inorganic flame retardant, or in situ by dry blending the flame retardant with the coating compounds, or by addition of the coating at the melt process with the other components.

The antioxidant employed in the present invention may be one or more types depending on compatibility with the other components. Suitable antioxidants are hindered phenolic antioxidants such as Tetrakis[methylene(3,5-di-tert-butyl-4-hydroxyhydrocinnamate)]methane available under the trade names Irganox 1010, Hostanox O10, and Songnox 1010; Secondary phosphite stabilizers such as Tris(2,4-di-tert-butylphenyl)phosphite available under the trade names Irgafos 168, Songnox 1680, and Hostanox PAR24; Thio Co-stabilizers such as Dilauryl-Thiodiproprionate available under the trade name Irganox PS800; Metal deactivators such as 2',3-bis[[3-[3,5-di-tert-butyl-4-hydroxyphenyl]propionyl]propionohydrazide available under the trade names Irganox MD 1024, Lowinox MD1024, and Songnox 1024. In the compositions of the present invention, the antioxidant is present in a range from about 0.05 to about 1 wt. %, including all ranges there between.

The flame retardant compositions of the present invention may be compounded further with other polymers, oils, fillers, reinforcements, colorants, stabilizers, lubricants, other flame retardant, and coating for the flame retardants and other rubber and plastic compounding ingredients without departing from the scope of this invention, provided that these ingredients do not greatly impact the properties of flame retardant. For example, agri-derived heat resistant liquid may be present from about 0 to about 7 wt. %, including all ranges there between. Such heat resistant liquid is non-halogen containing high molecular weight ether derived from agricultural sources. Coating for the flame retardants may also be present in a range of about 0.2 to about 7 wt. %, including all ranges there between, based on 100 wt. % of the composition.

The compositions of the present invention demonstrated unexpected and surprising improved balance of mechanical properties, flame retardancy, cost, and in some cases low viscosity. The compositions of the present invention may be used in a large number of applications. The following various end use applications and/or processes are meant to be illustrative, and not limiting to the present invention:

Extruded Articles, such as electrical insulation and jacketing, furniture edge banding, gaskets, seals, expansion joints, energy absorbing pads and joints, building construction joints and gaskets, etc. require flame retardancy. In addition, electrical wire insulation and jacketing includes multi-layer constructions of a jacket material on top of an insulation material. The jacket and insulation may or may not be of the same composition but at least one layer should be of the inventive compositions described herein.

Injection molded Articles such as electrical plug overmolds, gaskets, general injection molded articles or overmolds for industrial, consumer, or transportation applications requiring flame retardancy.

Industrial, consumer, or transportation Articles that could be manufactured by extrusion molding, injection molding, or calendaring.

EXAMPLES

Example 1

Polymer A is a proprietary controlled distribution polymer (S-EB/S-S) modified from U.S. Pat. Publ. 2012/0070665 A1 and has a polystyrene end block mol. wt. of 7.2 kg/mol and a total apparent mol. wt of 127 kg/mol, with a MFR of about 43 g/10 min. at 230° C. and 2.16 kg/weight. Polymer A is typified by its low viscosity and therefore its high melt flow rate as compared to traditional SEBS block copolymers with similar tensile strength.

All the ingredients were measured and introduced into an extruder, uniformly mixed and extruded into a thin strand of 1.6 mm thickness. The melt flow rate was tested at 200° C., 2.16 kg weight, and reported in grams per 10 mins. Each of the compositions containing 5.6 wt. % Polymer A, also had a UL-94 flame retardant classification of V-0, at 1.6 mm specimen thickness. Also the combination of high MFR, UL-94 V0 flammability rating and the elongation at break>80% is generally desirable for many flame retardant applications, especially wire and cable.

Using a traditional SEBS product (no controlled distribution midblock) generally yields a MFR for the entire composition of about 1 to 3 g/10 min. @ 200° C. with a weight of 2.16 kg per ASTM D-1238. When employing Polymer A, blended with other ingredients, it will boost the melt flow rate of the composition, as illustrated in Table 1 below.

In Table 1-A, the polyolefin is a combination of homopolypropylene and a polyolefin elastomer. Further, the inorganic flame retardant is a mixture of 3 components, namely Ultracarb (which is a natural product of huntite and hydromagnesite (greater than 50 wt. % hydromagnesite in the case of UltraCarb LH3)), and Jemini™ 100, an agri-derived heat resistant liquid product, and either a silane coated magnesium hydroxide or an unsaturated fatty acid coated magnesium hydroxide. PTFE is polytetrafluoroethylene known as Teflon®. AO stands for antioxidant. Table 1-B reports the test results for the formulations set forth in Table 1-A.

TABLE 1-A

| Product | Component Type | Producer | Concentration wt. (%) #1 | #2 | #3 | #4 |
|---|---|---|---|---|---|---|
| Polymer A | S-EB/S-S | Kraton Polymers | 7.1 | 5.6 | 7.1 | 5.6 |
| Moplen HP400R | PP-h | Lyondell Basell | 4.7 | 3.7 | 4.7 | 3.7 |
| Engage 8137 | polyolefin elastomer | Dow Chemical | 21.2 | 16.8 | 21.2 | 16.8 |
| UltraCarb LH3 (=EXFR0077) | $Mg_3Ca(CO_3)_4$ + $Mg_5(CO_3)_4(OH)_2 \cdot 4H_2O$ | Minelco | 60.1 | 60.0 | 60.1 | 60.0 |
| Kisuma 5P (silane treatment) | $Mg(OH)_2$ | Kyowa Chemical Industry Co | 4.0 | 10.1 | 0.0 | 0 |
| Kisuma 5B (unsaturated fatty acid treatment) | $Mg(OH)_2$ | Kyowa Chemical Industry Co | 0 | 0 | 4.0 | 10.1 |
| Jemini 100 | agri-derived liquid (non-halogen containing high molecular ether) | JJI Technologies | 2.12 | 2.99 | 2.12 | 2.99 |
| PTFE 6C | PTFE | DuPont | 0.14 | 0.11 | 0.14 | 0.11 |
| Irganox 1010 | primary AO | BASF | 0.12 | 0.12 | 0.12 | 0.12 |
| PS802FD | secondary AO (thioester) | BASF | 0.24 | 0.24 | 0.24 | 0.24 |
| Irganox MD1024 | metal deactivator | BASF | 0.24 | 0.24 | 0.24 | 0.24 |

TABLE 1-B

| Property | #1 | #2 | #3 | #4 |
|---|---|---|---|---|
| Tensile strength [MD/PMD] (MPa) ASTM D412 | 3.3/3.1 | 3.0/2.6 | 3.0/2.5 | 2.9/2.6 |
| Elongation at break [MD/PMD] (%) ASTM D412 | 418/619 | 87/123 | 181/276 | 68/89 |
| Hardness Shore A (30 s) ASTM D2240 | 79.3 | 78.6 | 79.0 | 79.0 |
| MFR@200° C./2.16 kg (g/10 min) ASTM D1238 | 21.5 | 22.8 | 8.3 | 14.2 |
| UL-94 @ 1.6 mm | — | V0 | — | V0 |

"—" means no rating measured, total burn
MD = machine direction;
PMD = perpendicular to machine direction elastomer. Lastly, the inorganic flame retardant is a mixture of 2 different coatings on synthetic magnesium hydroxide. All the ingredients were measured and introduced into an extruder, uniformly mixed and extruded into a thin strand of 1.6 mm thickness. Previously a tensile strength of 8 MPa and an initial elongation of 150% were acceptable for wire and cable, and many other applications. The composition of formula 5 has initial tensile strength>10 MPa and initial elongation of >600% making it suitable for a wide range of elastic flexible flame retardant applications, especially wire and cable applications. Certain test results are reported in Table 3.

TABLE 2

Formula 5

| Product Name | Component Type | Producer | Concentration wt. (%) |
|---|---|---|---|
| G1645 | SEBS | Kraton Polymers | 12.0 |
| FG1924 | MA-g-SEBS | Kraton Polymers | 3.0 |
| Moplen HP500N | PP-h | Lyondell Basell | 10.0 |
| MB 50-001 | siloxane PP-h masterbatch (surface lubrication additive) | Dow Corning | 3.1 |
| Vistamaxx 6102 | propylene-ethylene elastomer | Exxon Mobil | 10.6 |
| Magnifin H5iV (aminosilane treated) | $Mg(OH)_2$ | Albemarle (Martinswerk) | 42.5 |
| Magnifin H5MV (proprietary treatment) | $Mg(OH)_2$ | Albemarle (Martinswerk) | 17.5 |
| Carbon black 2005 | carbon black | Cabot | 1.00 |
| Irganox 1010 | primary AO | BASF | 0.10 |
| Irganox PS800 | secondary AO (thioester) | BASF | 0.10 |
| Irganox MD1024 | metal deactivator | BASF | 0.10 |

Example 2

In this example, as shown in Table 2, both a SEBS and a functionalized SEBS are employed. The olefin is a combination of homo-polypropylene, a master batch of siloxane and homo-polypropylene, and polypropylene-ethylene)

TABLE 3

| Property (initial, before ageing) | Formula 5 |
|---|---|
| Tensile strength (MPa) | 10.7 ± 0.99 |
| Elongation at break (%) | 685 ± 27 |
| ISO 6722 Resistance to flame propagation | pass |

Example 3

In Example 3, 3 different compositions were compared using the ingredients set forth in Table 4. The SEBS was a combination of SEBS and functional SEBS. The olefin was a combination of polyolefin elastomer, random propylene copolymer, linear low density polyethylene, and a blend of siloxane and homo-polypropylene in a master batch. The inorganic flame retardant was a coated synthetic magnesium hydroxide. Silane coated magnesium hydroxide, was compared against an unsaturated fatty acid coated magnesium hydroxide, and against silane treatment vinyl functional, coupling coated magnesium hydroxide. All the ingredients were measured and introduced into an extruder, uniformly mixed and extruded into a thin strand of 1.6 mm thickness. The composition, containing silane coated synthetic magnesium hydroxide as the flame retardant, passed the flame retardant test UL-94 with a V0 rating.

TABLE 4

| Product Name | Component Type | Producer | Concentration wt. (%) | | |
|---|---|---|---|---|---|
| G1643 | SEBS | Kraton Polymers | 6.8 | 6.8 | 6.8 |
| FG1924 | MA-g-SEBS | Kraton Polymers | 3.4 | 3.4 | 3.4 |
| Engage 8137 | polyolefin elastomer | Dow Chemical | 10.7 | 10.7 | 10.7 |
| PM940M | random copolymer PP | SunAllomer | 3.4 | 3.4 | 3.4 |
| NOVATEC LF405M | LDPE | Japan Polyethylene Corporation | 3.4 | 3.4 | 3.4 |
| BY27-001 | siloxane PP-H masterbatch (surface lubrication additive) | Dow Corning Toray Co. | 2.3 | 2.3 | 2.3 |
| Kisuma 5B (unsaturated fatty acid treated) | Mg(OH)$_2$ | Kyowa Chemical Industry Co | 70 | 0 | 0 |
| Kisuma 5P (silane treated) | Mg(OH)$_2$ | Kyowa Chemical Industry Co | 0 | 70 | 0 |
| Zerogen 100SV (silane treatment, vinyl functional, coupling) | Mg(OH)$_2$ | Huber Engineered Materials | 0 | 0 | 70 |
| UL-94 rating (1.6 mm) | | | — | V0 | — |

"—" means no rating, total burn

Example 4

In this example, a natural flame retardant, or a blend of natural and synthetic flame retardant were compared. For extrusion coated fabrics, a low melt flow rate is acceptable. Further, a UL-94 V1 rating is acceptable, especially for coated fabric but also in some instances for extrusion coated wire applications. The MFR indicates that for best processing results at least some synthetic flame retardant should be used, as set forth in Table 5. All the ingredients were measured and introduced into an extruder, uniformly mixed and extruded into a thin strand of 1.6 mm thickness. These compositions exhibit UL-94 V1 flammability ratings along with elongations at break>150% when measured on strand samples as reported in Table 6.

TABLE 5

| Product | Component type | Producer | Concentration wt. (%) | | |
|---|---|---|---|---|---|
| | | | E-0681 #1 | E-0681 #2 | E-0681 #3 |
| Kraton G1645 | SEBS | Kraton Polymers | 8.5 | 8.5 | 8.5 |
| Kraton FG1924 | MA-g-SEBS | Kraton Polymers | 5.0 | 5.0 | 5.0 |
| Moplen HP500N | PP-h | Lyondell Basell | 10.2 | 10.2 | 10.2 |
| Vistamaxx 6202 | propylene-ethylene elastomer | Exxon Mobil | 5.0 | 5.0 | 5.0 |
| Ecopiren 3C | natural Mg(OH)$_2$, stearate treated | Russian Mining Chemical Company | 65.0 | 55.0 | 60.0 |
| Magnifin H5iV | Mg(OH)$_2$, aminosilane treated | Albemarle (Martinswerk) | 0 | 5.0 | 5.0 |
| Magnifin H5MV | Mg(OH)$_2$, proprietary treatment | Albemarle (Martinswerk) | 0 | 5.0 | 0 |
| Jemini 100 | agri-derived liquid (non-halogen containing high molecular ether) | JJI Technologies | 5.0 | 5.0 | 5.0 |

TABLE 5-continued

| Product | Component type | Producer | Concentration wt. (%) | | |
|---|---|---|---|---|---|
| | | | E-0681 #1 | E-0681 #2 | E-0681 #3 |
| Carbon Black 2005 | black masterbatch | Cabot | 1.0 | 1.0 | 1.0 |
| Irganox 1010 | primary AO | BASF | 0.05 | 0.1 | 0.1 |
| Irgafos 168 | secondary AO | BASF | 0.05 | 0.1 | 0.1 |
| Irganox PS800 | secondary AO (thioester) | BASF | 0.05 | 0.1 | 0.1 |
| Irganox MD1024 | metal deactivator | BASF | 0.1 | 0.1 | 0.1 |
| | | | MFI @230° C./5 kg (g/10 min) | | |
| | | | 0.2 | 1.0 | 1.0 |

TABLE 6

| Property | E-0681 #1 | E-0681 #2 | E-0681 #3 |
|---|---|---|---|
| Elongation at break (%) wires | 220 ± 22.6 | 227 | 205 |
| Elongation at break (%) injection molded samples [MD/PMD] | 71/114 | 70/174 | 65/127 |
| Elongation at break (%) strands from compounding extruder (Coperion ZSK 26 Mc) | 285 | 227 | 87 |
| UL-94 (1.6 mm) specimen thickness | V1 | V1 | V1 |

MD = machine direction;
PMD = perpendicular to machine direction

Example 5

In this example, insulation wire is extrusion coated with a compound containing a synthetic flame retardant, and compared against a blend of synthetic flame retardants. All the ingredients were measured and introduced into an extruder, uniformly mixed and extruded into a thin strand of 1.6 mm thickness. While Example 4 indicates that for best MFR (ease of processing) some synthetic flame retardant should be used, the compositions in Table 7 surprisingly do not indicate that there is any physical property difference while the use of natural $Mg(OH)_2$ leads to substantially lower cost. Less SEBS was employed, but more polyolefin was employed. Also no agri-derived heat resistant liquid was employed in the compositions of Table 7.

TABLE 7

| Product | Component Type | Producer | Concentration wt. (%) | |
|---|---|---|---|---|
| | | | E-0651 #6 | E-0651 #5 |
| G1645 | SEBS | Kraton | 12.0 | 12.0 |
| FG1924 | MA-g-SEBS | Kraton | 3.0 | 3.0 |
| Moplen HP500N | PP-h | Lyondell Basell | 10.2 | 10.2 |
| MB50-001 | siloxane PP-H masterbatch (surface lubrication additive) | Dow Corning | 3.0 | 3.0 |
| Vistamaxx 6102 | propylene-ethylene elastomer | Exxon Mobil | 10.5 | 10.5 |
| UltraCarb LH3 | $Mg_3Ca(CO_3)_4$ + $Mg_5(CO_3)_4(OH)_2 \cdot 4H_2O$ | Minelco | 0.0 | 60.0 |
| Magnifin H5IV (aminosilane treated) | $Mg(OH)_2$ | Albemarle (Martinswerk) | 43.0 | 0.0 |
| Magnifin H5MV (proprietary treatment) | $Mg(OH)_2$ | Albemarle (Martinswerk) | 17.0 | 0.0 |
| Carbon Black 2005 | carbon black | Cabot | 1.0 | 1.0 |
| Irganox 1010 | primary AO | BASF | 0.1 | 0.1 |
| Irgafos 168 | secondary AO | BASF | 0.1 | 0.1 |
| PS800 | secondary AO (thioester) | BASF | 0.1 | 0.1 |
| Irganox MD1024 | metal deactivator | BASF | 0.1 | 0.1 |
| | | | MFR@ 200° C./ 5 kg (g/10 min) | |
| | | | 1.8 | 1.8 |

Example 6

In this example, an electronic cable was constructed according to EN50525-3-11 300/300V. The insulation of the cable was composed of the formula represented in formula 5 in Table 2, whereby both a SEBS and a functionalized SEBS are employed. The olefin is a combination of homo-polypropylene, a master batch of siloxane and homo-polypropylene, and polypropylene-ethylene) elastomer. The inorganic flame retardant is a mixture of 2 different coatings on synthetic magnesium hydroxide. The jacket was composed as indicated in Formula 6 below:

Formula 6

| Component | Concentration (%) |
| --- | --- |
| SEBS (Kraton G1645) | 22.5 |
| PP Elastomer (Vistamaxx 6102) | 13 |
| Maleic Anhydride Grafted PP (Orevac CA-100) | 1.50 |
| PP Homopolymer (Moplen HP500N) | 16 |
| Intumescent Flame Retardant Mixture (Adeka FP220s) | 40.10 |
| Siloxane Surface Lubrication Additive (MV50-001) | 4 |
| Processing Aids And Antioxidants (EVA, Calcium Sterate, Irganox, metal deactivator, DLTDP, Irgafos) | 3 |

Which passes the EN60332-1-2 flammability test, the EN61034-2 smoke density test (greater than 60% transmission), and the EN50395-3-11 voltage and insulation resistance tests (at 70° C.-1.9 MΩ×km). The tensile strength and the elongation for the jacket are illustrated in Table 8. The tensile strength and elongation for the insulation are illustrated in Table 9.

TABLE 8

Wire Name 55
Wire Type EU Jacket

| Initial Physical Properties | | | | |
| --- | --- | --- | --- | --- |
| Tensile Strength | MPa | Median | >7.5 MPa | 9.9 |
| Std | MPa | Std.s | | 0.2 |
| Elongation at Break | % | Median | >150 MPa | 692 |
| Std | % | Std.s | | 8.7 |
| Compatibility Ageing (1 days/80° C.) | | | | |
| Tensile Strength | MPa | Median | | 9.1 |
| Std | MPa | Std.s | | 0.3 |
| Elongation at Break | % | Median | | 660 |
| Std | % | Std.s | | 11.0 |
| Remaining TS | % | Variation | 80-120 MPa | 91.7 |
| Remaining EaB | % | Variation | 80-120 MPa | 95.4 |
| Compatibility Ageing (2 days/80° C.) | | | | |
| Tensile Strength | MPa | Median | | 9.1 |
| Std | MPa | Std.s | | 0.2 |
| Elongation at Break | % | Median | | 660 |
| Std. | % | Std.s | | 14.6 |
| Remaining TS | % | Variation | 80-120 MPa | 91.6 |
| Remaining EaB | % | Variation | 80-120 MPa | 95.4 |
| Compatibility Ageing (3 days/80° C.) | | | | |
| Tensile Strength | MPa | Median | | 9.3 |
| Std | MPa | Std.s | | 0.1 |
| Elongation at Break | % | Median | | 652 |
| Std. | % | Std.s | | 8.7 |
| Remaining TS | % | Variation | 80-120 MPa | 93.7 |
| Remaining EaB | % | Variation | 80-120 MPa | 94.2 |

TABLE 8-continued

Wire Name 55
Wire Type EU Jacket

| Compatibility Ageing (3 days/80° C.) | | | | |
| --- | --- | --- | --- | --- |
| Tensile Strength | MPa | Median | | 9.8 |
| Std | MPa | Std.s | | 0.3 |
| Elongation at Break | % | Median | | 640 |
| Std. | % | Std.s | | 19.1 |
| Remaining TS | % | Variation | 80-120 MPa | 98.5 |
| Remaining EaB | % | Variation | 80-120 MPa | 92.5 |
| Other Information | | | | |
| Weight | g | | | |
| Length | cm | | | |
| Area | mm | | | 10.180 |
| Initial Mark Distance | cm | | | 2.5 |

TABLE 9

Wire Name EU Trial-Y & G-70
Wire Type EU Insulation

| Initial Physical Properties | | | | |
| --- | --- | --- | --- | --- |
| Tensile Strength | MPa | Median | >7.5 | 9.1 |
| Std | MPa | Std.s | | 0.4 |

| | Force | TS |
| --- | --- | --- |
| Sample 1 | 24.9 | 9.1 |
| Sample 2 | 26.7 | 9.8 |
| Sample 3 | 25.0 | 9.2 |
| Sample 4 | 25.8 | 9.5 |
| Sample 5 | 24.8 | 9.1 |
| Sample 6 | 23.9 | 8.7 |

| Elongation at Break | % | Median | >150 | 433 |
| --- | --- | --- | --- | --- |
| Std | % | Std.s | | 17.1 |

| | Final Distance | EaB |
| --- | --- | --- |
| Sample 1 | 18 | 414.0 |
| Sample 2 | 18.8 | 437 |
| Sample 3 | 18.5 | 429 |
| Sample 4 | 19.5 | 457 |
| Sample 5 | 19.5 | 457 |
| Sample 6 | 18.5 | 429 |

Aging Physical Properties (7 days/80° C.)

| Tensile Strength | MPa | Median | 8.6 |
| --- | --- | --- | --- |
| Std | MPA | Std.s | 0.2 |

| | Force | TS |
| --- | --- | --- |
| Sample 1 | 24.4 | 8.9 |
| Sample 2 | 24.7 | 9.1 |
| Sample 3 | 23.2 | 8.5 |
| Sample 4 | 23.5 | 8.6 |
| Sample 5 | 23.6 | 8.6 |
| Sample 6 | | 0.0 |

| Elongation at Break | % | Median | 380 |
| --- | --- | --- | --- |
| Std | % | Std.s | 17.9 |

| | Final Distance | EaB |
| --- | --- | --- |
| Sample 1 | 16.8 | 380 |
| Sample 2 | 17.3 | 394 |
| Sample 3 | 15.8 | 351 |
| Sample 4 | 16.5 | 371 |
| Sample 5 | 17.3 | 394 |
| Sample 6 | | |

TABLE 9-continued

Wire Name EU Trial-Y & G-70
Wire Type EU Insulation

| Remaining TS | % | Average | 80-120 |
|---|---|---|---|
| Remaining EaB | % | Average | 80-120 |

Other Information

| Inner Diameter | mm | 1.15 |
|---|---|---|
| Outer Diameter | mm | 2.19 |
| Area | mm² | 2.727 |
| Initial Mark Distance | cm | 3.5 |

Example 7

In Example 7, both a SEBS and a functionalized SEBS are employed. The olefin is a combination of a homo-polypropylene and polypropylene-ethylene) elastomer. A combination of a natural fire retardant and an organo modified siloxane fire retardant were utilized. All the ingredients in accordance with Formula 7 were measured and introduced into an extruder, uniformly mixed and extruded into a thin strand of 1.6 mm thickness. The composition sample based upon Formula 7 passed the flame retardant test UL-94 with a V0 rating.

Formula 7

| Product | Component type | Concentration Wt. (%) |
|---|---|---|
| Kraton G1645 | SEBS | 8.5 |
| Kraton FG1924 | MA-g-SEBS | 5 |
| Moplen HP500N | PP-h | 10.2 |
| Vistamaxx 6202 | propylene-ethylene elastomer | 5 |
| Ecopiren 3,5C | natural Mg(OH)2, stearate treated | 65 |
| Jemini 100 | agri-liquid | 2.7 |
| Tegomer FR100 | organomodified siloxane [solid pellets] | 2 |
| Carbon Black 2005 | black masterbatch | 1 |
| Irganox 1010/Songnox 1010 | primary AO | 0.12 |
| Irgafos 168/Songnox 1680 | secondary AO | 0.12 |
| Irganox PS800/Songnox DLTDP | secondary AO (thioester) | 0.12 |
| Irganox MD1024/Songnox 1024 | metal deactivator | 0.24 |
| Property | | |
| Tensile strength (MPa) | | |
| strands from compounding extruder (Coperion) | | 8 |
| injection molded samples [MD/PMD] | | 9/7 |
| Elongation at break (%) | | |
| strands from compounding extruder (Coperion) | | 74 |
| injection molded samples [MD/PMD] | | 60/86 |
| MFI @230° C./5 kg (g/10 min) | | 1 |

Formula 7

| Product | Component type | Concentration Wt. (%) |
|---|---|---|
| Hardness Shore A (30 s) | | 95 |
| UL-94 (1.6 mm) | | V0 |

Example 8

This example is identical to example 2, wherein the composition is composed in accordance with Formula 5. In this example, Halox FR1120 was added for further smoke suppressant properties (10% of $Mg(OH)_2$ is replaced with Halox FR 1120). The composition was tested for smoke suppression according to ISO 5659-2, under the conditions 25 kW/m² in the presence of a pilot flame and nominally 0.5 mm thick plates. This composition passed ISO 5659-2, as set forth below.

| Formula | Specific Optical Density | Ds (max) | D (clear beam) | Time to Ds max (s) | Test Duration (s) | Color of Smoke Produced |
|---|---|---|---|---|---|---|
| Formula 5 | 53 | 53 | 7 | 208 | 600 | dark |
| Formula 5 + smoke suppressant | 31 | 31 | 5 | 666 | 1000 | light |

Thus it is apparent that there has been provided, in accordance with the invention several flame retardant compositions which possess a good balance of tensile strength, elongation, flame resistance and processability making them suitable for applications such as fabric, upholstery, carpet, barrier, automotive, building construction, communication and consumer electronics. These applications employ the unique and novel compositions of the present invention that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly it is intended to embrace all such alternatives, modifications and variations as fall within the spirit and broad scope of the appended claims.

What is claimed is:

1. A flame retardant composition comprising:
   from about 5 to about 18 wt. % of a hydrogenated styrenic block copolymer wherein said hydrogenated styrenic block copolymer is a mixture of SEBS and functionalized SEBS, formed sequentially or radially,
   from about 6 to about 40 wt. % of a polyolefin,
   from about 50 to about 80 wt. % of a mixture of one or more inorganic flame retardants with one or more coated inorganic flame retardants, with at least 10 wt. % of said mixture being coated inorganic flame retardant, and
   from about 0.05 to about 1.0 wt. % of an antioxidant,
   wherein said coated inorganic flame retardant comprises a mixture of at least two groups of blended particles, each group with a different coatings, wherein said coating comprises from about 0.2 wt. % to about 5 wt. % of the inorganic flame retardant,
   wherein said composition totals 100 wt. %,
   wherein said composition has a melt flow rate>1.5 g/10 min. measured at 200° C. and 2.16 kg mass, and wherein said composition has a tensile strength greater than 10 MPa when measured in accordance with ASTM D412.

2. The flame retardant composition of claim 1, wherein said polyolefin is a polyolefin homo-polymer, a polyolefin copolymer, a functionalized polyolefin, a polyolefin elastomer, or a mixture of 2 or more of these.

3. The flame retardant composition of claim 2, wherein the functionalized polyolefin is functionalized with maleic anhydride, said polyolefin elastomer is a $C_5$-$C_9$ hydrocarbon with either ethylene or propylene, and said homopolymer is polypropylene or polyethylene.

4. The flame retardant composition of claim 1, wherein said polyolefin homopolymer is LLDPE, LDPE, or HDPE, or a mixture of 2 or more of these.

5. The flame retardant composition of claim 1, wherein said flame retardant is selected from the group consisting of aluminum hydroxide, gibbsite, bayesite, nordstrandite and doylite, magnesium hydroxide, huntite, brucite, hydromagnesite, and a mixture of 2 or more of these.

6. The flame retardant composition of claim 1, wherein said coated inorganic flame retardant is coated with silane, stearate, non-polar non-functionalized polymeric coating, siloxane compounds, or a mixture of 2 or more of these.

7. The flame retardant composition of claim 6, wherein said coated inorganic flame retardant is formed in-situ by the addition of said coating during dry blending of the composition, or blending into the inorganic flame retardant during melt processing.

8. The flame retardant composition of claim 1, wherein said functionalized SEBS is grafted with a monomer acid or its derivatives, wherein suitable monomer acids or their derivatives include maleic acid, succinic acid, itaconic acid, fumaric acid, and acrylic acid.

9. The flame retardant composition of claim 1, wherein said antioxidant is a hindered phenolic antioxidant such as tetrakis[methylene(3,5-di-tert-butyl-4-hydroxyhydro-cinnamate)]methane; a secondary phosphite stabilizer such as tris(2,4-di-tert-butylphenyl); or a thio co-stabilizer such as dilauryl-thiodiproprionate or a mixture of 2 or more of these.

10. The flame retardant composition of claim 1, wherein said hydrogenated block copolymer is of the formula ABA, (A-B)$_n$X, or (A-B-A)$_n$X where n is an integer from 2 to about 30, and X is a coupling agent residue, the hydrogenated block copolymer having a number average molecular weight of from about 70 kg/mol to about 150 kg/mol and comprising at least two polymer blocks (A) composed mainly of a vinyl aromatic compound and at least one hydrogenated polymer block (B) composed of a conjugated diene compound, the A block contains a number average weight from about 5.0 to about 7.5 kg/mol wherein the B block contains a controlled distribution of styrene.

11. The flame retardant composition of claim 10, wherein said controlled distribution of styrene is from about 10 wt. % to about 40 wt. %.

12. The flame retardant composition of claim 10, further comprising the hydrogenated block copolymer having a MFR of about 43 g/10 min. at 230° C. and 2.16 kg.

13. The flame retardant composition of claim 10, wherein said inorganic flame retardant is selected from the group consisting of aluminum hydroxide, gibbsite, bayesite, nordstrandite and doylite, magnesium hydroxide, huntite, brucite, hydromagnesite, and a mixture of 2 or more.

14. The flame retardant composition of claim 10 having a tensile strength greater than 10 MPa when measured in accordance with ASTM D412.

15. The flame retardant composition of claim 1, consisting of the hydrogenated styrenic block copolymer, the polyolefin, the mixture of one or more inorganic flame retardants with one or more coated inorganic flame retardants, the antioxidant, optionally, up to 7 wt. % of an additive selected from the group consisting of a metal deactivator, a colorant, a filler, a lubricant, or a combination thereof, and optionally, up to 7 wt. % of an agri-derived heat resistant liquid.

\* \* \* \* \*